United States Patent [19]
Brolin et al.

[11] 4,277,647
[45] Jul. 7, 1981

[54] COIN SIGNALING SYSTEM

[75] Inventors: Stephen J. Brolin, Livingston; Samuel Colodner, Succasunna, both of N.J.

[73] Assignee: Bell Telephone Laboratories, Incorporated, Murray Hill, N.J.

[21] Appl. No.: 71,713

[22] Filed: Aug. 31, 1979

[51] Int. Cl.³ .......................................... H04M 17/02
[52] U.S. Cl. .............................. 179/6.3 R; 179/17 E; 370/71
[58] Field of Search ................. 179/6.3 R, 2.51, 17 A, 179/17 E, 18 FA; 370/71

[56] References Cited

U.S. PATENT DOCUMENTS

| | | | |
|---|---|---|---|
| 3,673,330 | 6/1972 | Suntop et al. | 370/71 |
| 3,902,017 | 8/1975 | Steward | 179/17 E |
| 4,010,328 | 3/1977 | McGuire | 179/6.3 R |
| 4,048,448 | 9/1977 | Canniff et al. | 179/17 E |
| 4,056,690 | 11/1977 | Brolin et al. | 179/17 A |
| 4,063,036 | 12/1977 | Hunsicker | 179/6.3 R |
| 4,099,032 | 7/1978 | Roge et al. | 179/18 FA |
| 4,105,867 | 8/1978 | Levasseur et al. | 179/6.3 R |
| 4,143,287 | 3/1979 | Biggs | 307/311 |
| 4,174,468 | 11/1979 | Stelte | 179/6.3 R |

Primary Examiner—Gerald L. Brigance
Attorney, Agent, or Firm—Robert O. Nimtz

[57] ABSTRACT

A subscriber loop carrier system is shown in which coin first and dial tone first pay stations can be serviced through the carrier system without modifying the central office. Coin supervisory states are detected at the central office terminal of the system, translated into unique cyclic codes for transmission through the system and detected at the remote terminal by reapplication of the coin supervisory states at the remote terminal. Coin first and dial tone first modes of operation are accommodated with simple option plugs.

10 Claims, 8 Drawing Figures

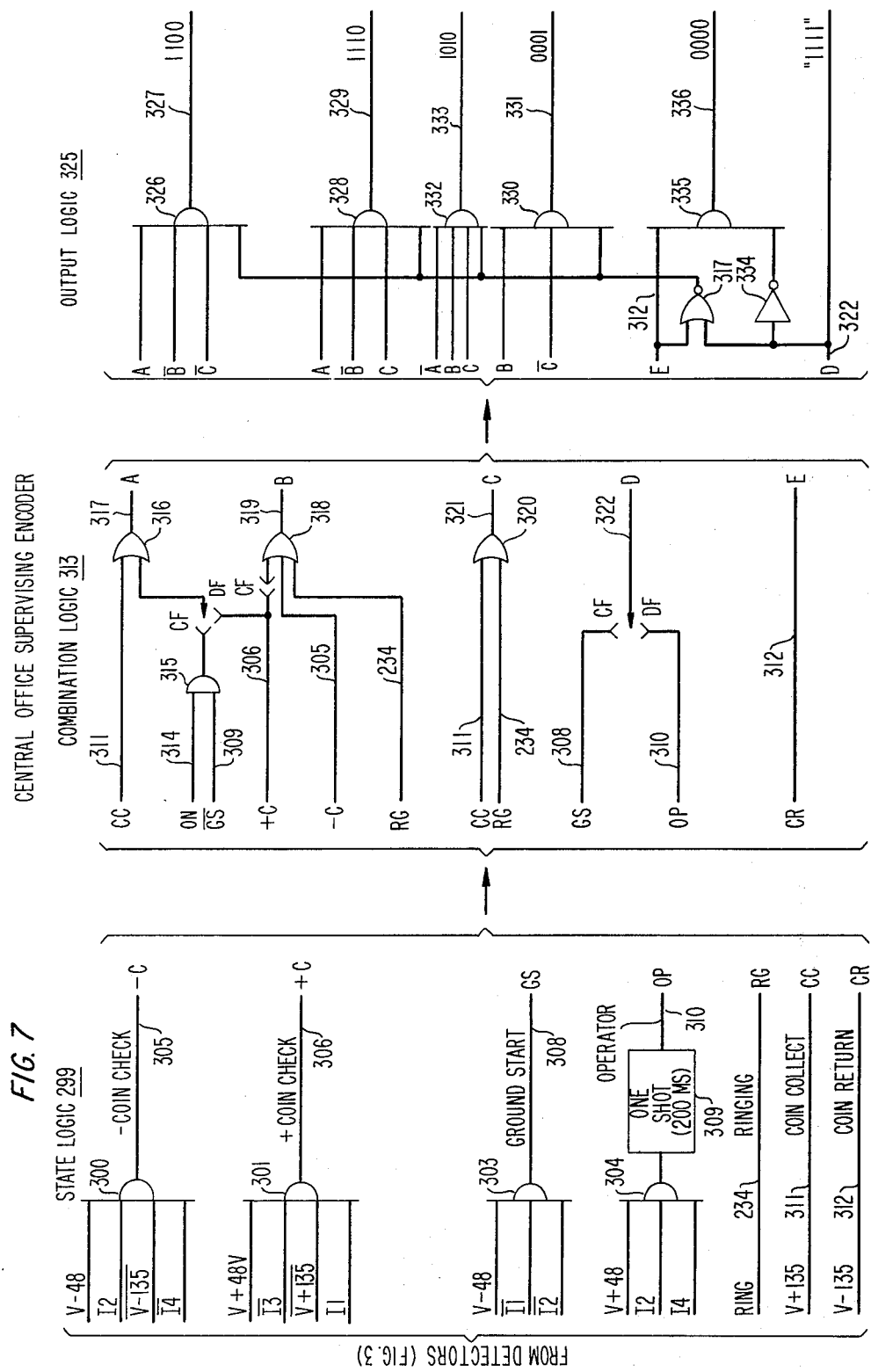

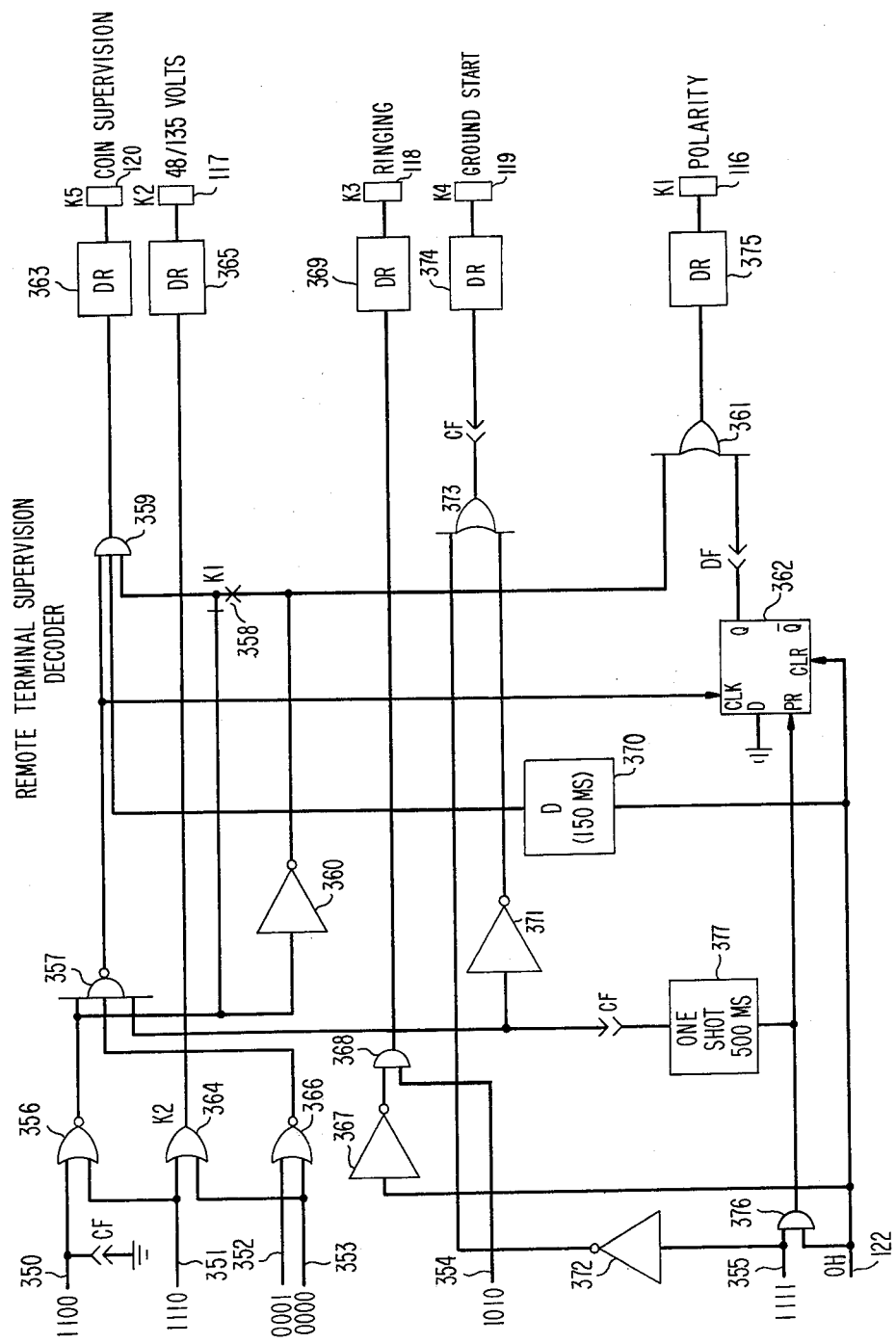

COIN SIGNALING SYSTEM

BACKGROUND OF THE INVENTION

1. Field of the Invention

This invention relates to subscriber loop carrier systems and, more particularly, to coin station signaling in such systems.

2. Description of the Prior Art

It is well-known to provide a large number of telephone subscriber channels on a single transmission facility by means of time division or frequency division techniques. A time division subscriber loop carrier system utilizing delta modulation is shown in R. J. Canniff et al U.S. Pat. No. 4,048,448, granted Sept. 13, 1977.

Subscriber loop carrier systems of the type disclosed in the above-identified Canniff et al patent are arranged to provide standard telephone supervisory signaling through the multiplex transmission system. Thus, off-hook supervision and ringing are provided by utilizing special codes in the digital pulse stream to carry the supervisory information. If such a system is to be used for providing service to coin stations, it is necessary to similarly encode all of the necessary coin station supervisory signals such as coin check, coin collect and coin return as well as the normal off-hook and ringing supervision. Since this type of supervision utilizes a wide variety of direct current voltages and polarities at the central office, it is necessary to detect these supervisory signals, encode them for transmission on the multiplex transmission facility and regenerate the supervisory conditions at the remote coin station drop wires. The large number and complex interrelationship of these supervisory signals have made the provision of coin station service in subscriber loop carrier systems a difficult objective.

Coin stations can provide service in two different modes. The first mode, called "dial tone first," enables the station user to receive dial tone immediately upon picking up the handset and hence the user is immediately able to dial the called number. Some coin stations, however, operate in a "coin first" mode in which the user must drop a coin into the pay station slot before receiving dial tone and thus being enabled to dial a number.

SUMMARY OF THE INVENTION

In accordance with the illustrative embodiment of the present invention, both dial tone first and coin first service are provided over a subscriber loop carrier system in which a large number of subscriber channels are derived on two pairs of telephone wires. In particular, all of the central office supervisory states are detected by means of voltage and current detectors, the outputs of which are combined logically to uniquely identify each supervisory state. These supervisory states are then encoded in cyclic codes which are transmitted in the channel time slots of the coin station channel. At the remote terminal, these unique cyclic codes are detected and used to replicate the appropriate supervisory voltage conditions on the pay station loop.

In accordance with one feature of the present invention, the coin supervisory circuits can be adjusted for dial tone first or coin first operation simply by inserting an appropriate option plug into the channel units. A single circuit arrangement can therefore be used for both types of operation and adjustments made in the field, as required, to change from one to the other type of operation.

BRIEF DESCRIPTION OF THE DRAWINGS

In the drawings:

FIG. 7 is a detailed circuit diagram of a supervisory signal encoder useful in the central office channel unit of FIG. 2; and FIG. 8 is a detailed circuit diagram of a supervisory signal decoder useful in the remote terminal channel unit of FIG. 3.

DETAILED DESCRIPTION

Figure 1:
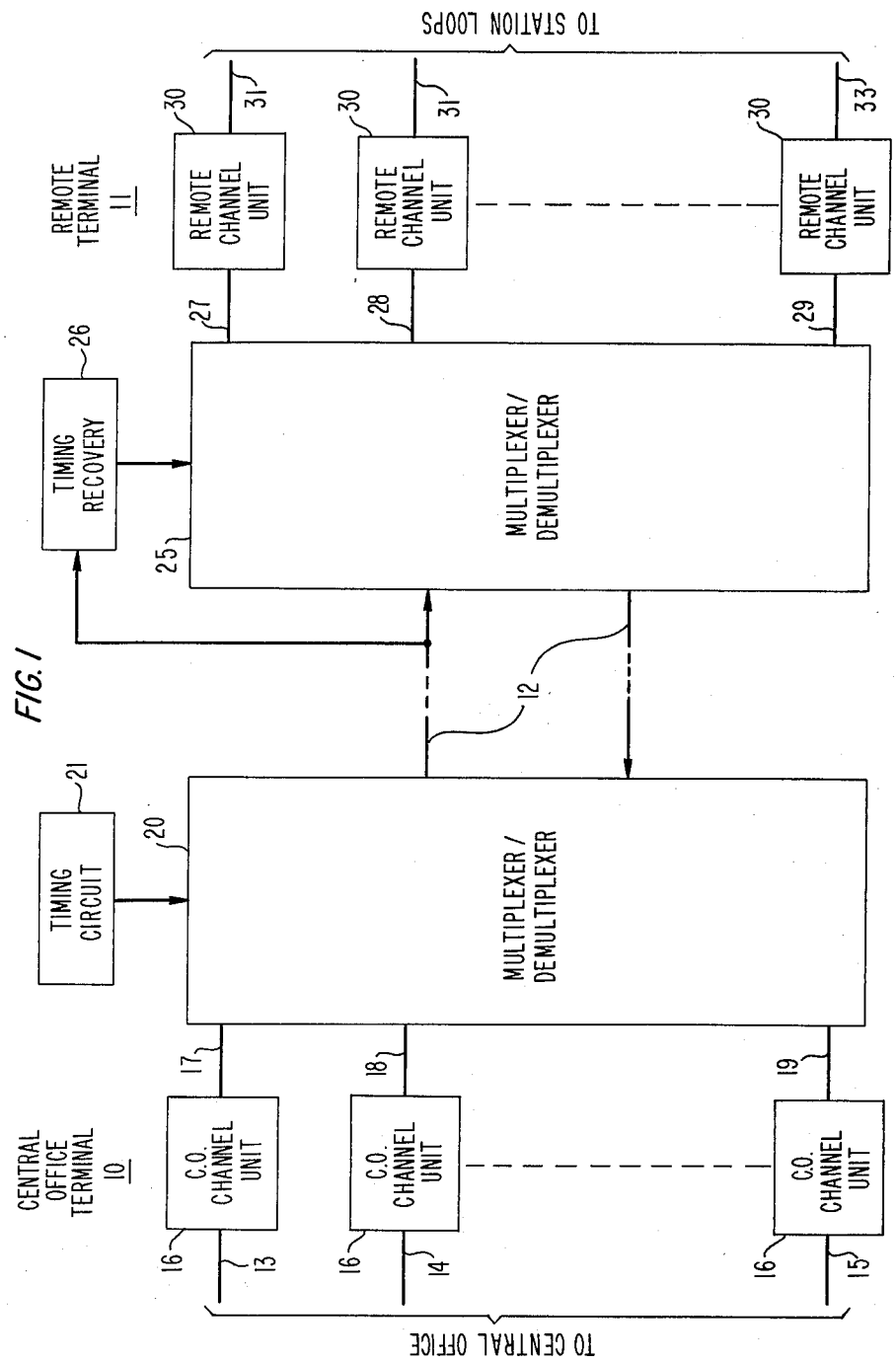
FIG. 1 is a general block diagram of a multichannel subscriber loop carrier system in which the coin station supervisory system of the present invention might find use.

In FIG. 1 there is shown a general block diagram of a subscriber loop carrier system in which the coin station supervisory arrangements of the present invention will find use. The carrier system of FIG. 1 comprises a central office terminal 10 and a remote terminal 11 interconnected by a transmission facility 12, which in the preferred embodiment comprises two pairs of standard telephone subscriber loop conductors.

The central office terminal 10 includes a plurality of subscriber lines 13, 14, . . . , 15, which represent the subscriber appearances of those lines at the telephone central office. Central office channel units 16 are interposed in each of subscriber lines 13 through 15 to translate analog signals on the subscriber appearances 13 through 15 into two-way digital signals on respective lines 17, 18, . . . , 19. The digital pulse streams from central office channel units 16 are multiplexed and demultiplexed in circuits 20 under control of clock signals from timing circuit 21. Outgoing line 12 therefore contains a multiplexed digital stream carrying digitally coded information concerning the signals on each of subscriber appearances 13 through 15. Similarly, incoming line 12 carries a digital pulse stream of digitally coded signals from remote terminal 11 and intended for the individual ones of subscriber appearances 13 through 15.

At remote terminal 11 a multiplexing and demultiplexing circuit 25 receives and transmits, respectively, these pulse streams under the control of clock signals from a timing recovery circuit 26. By the use of standard framing techniques, the various channels are separated in circuit 25 and delivered to appropriate ones of lines 27, 28 . . . 29, and thence to remote terminal channel units 30. Channel units 30 interface between digital signals on lines 27 through 29 and analog signals on corresponding subscriber appearances 31, 32, . . . 33. These analog signals are delivered to and received from standard telephone subscriber stations, some or all of which may be coin stations, connected to lines 31 through 33.

The carrier system of FIG. 1 is a standard digital multiplex arrangement and can be used over a wide variety of transmission facilities including, not only conductor pairs, but also coaxial cable, microwave links, and satellite circuits. One such multiplex system is shown in J. L. Caldwell U.S. Pat. No. 3,924,080, granted Dec. 2, 1975.

Figure 2:
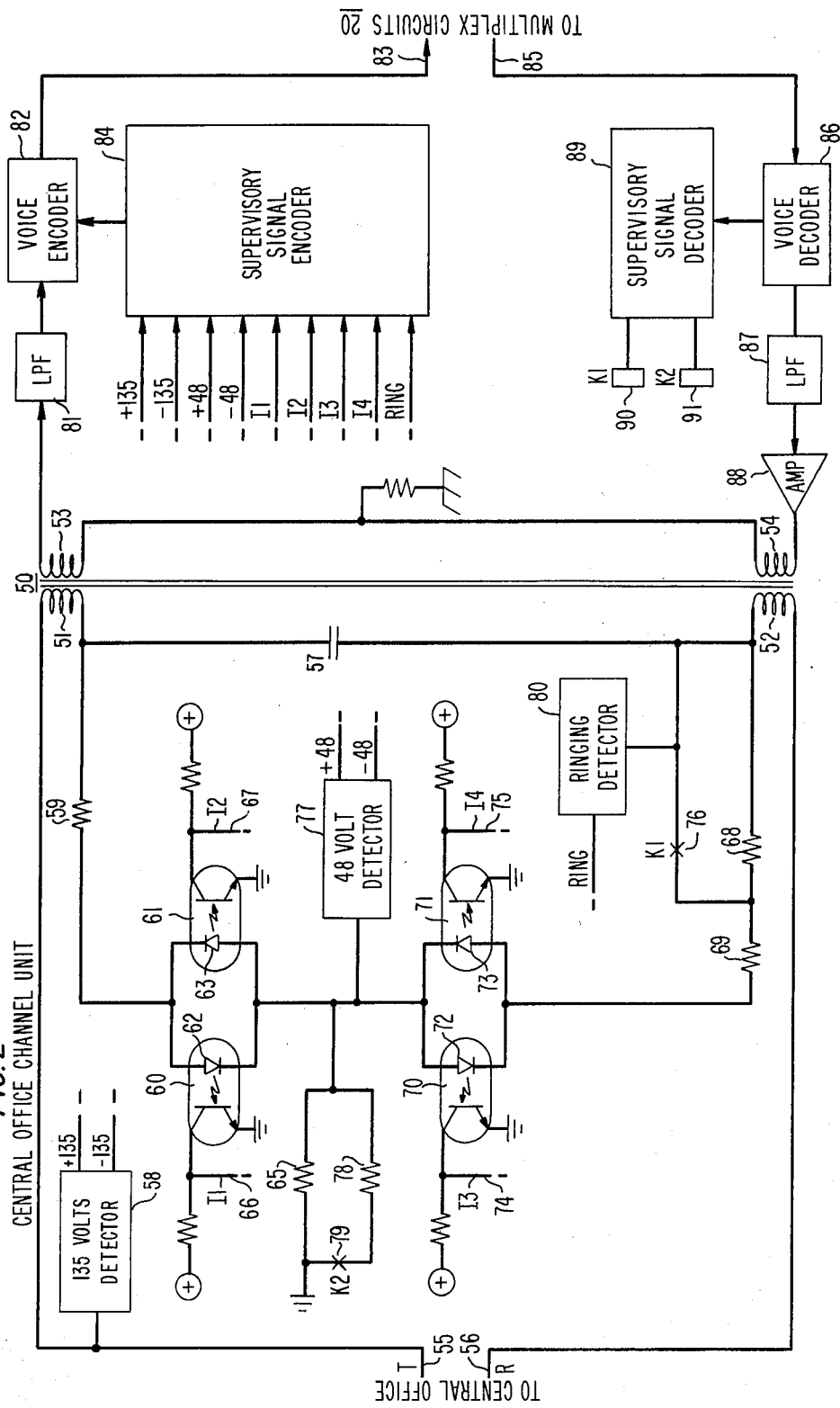
FIG. 2 is a detailed circuit diagram of a central office channel unit useful for coin stations in the system of FIG. 1.

In FIG. 2 there is shown a detailed circuit diagram of a central office channel unit 16 in FIG. 1 which can be used for coin station operation. The channel unit of FIG. 2 comprises a hybrid transformer 50 having primary windings 51 and 52 and secondary windings 53 and 54. The tip conductor 55 and the ring conductor 56 from the central office are connected to primary windings 51 and 52, respectively. A capacitor 57 is connected between windings 51 and 52 to block direct current flow. A voltage detector 58 is connected to tip conductor 55 and detects coin collect/return voltages which are nominally + or −135 volts.

The lower end of primary winding 51 is connected through resistor 59 to two optical isolators 60 and 61, including light-emitting diodes 62 and 63, respectively, which are poled in opposite directions. The common lower connection of diodes 62 and 63 is connected through a resistor 65 to ground potential. Thus, any voltages appearing on tip conductor 55 will cause a current to flow through winding 51, resistor 59, resistor 65 and diode 62 or diode 63 to ground potential. If tip conductor 55 is positive with respect to ground, diode 62 will conduct and provide an output on lead 66 from optical isolator 60. If, on the other hand, tip conductor 55 is negative with respect to ground, current will be conducted through diode 63 and an output will appear on lead 67 from optical isolator 61. Thus, signals on leads 66 and 67 indicate the polarity of the current flow in tip conductor 55.

Similarly, the upper end of primary winding 52 is connected through resistors 68 and 69 to optical isolators 70 and 71. Isolators 70 and 71 each include a light-emitting diode, diodes 72 and 73, respectively, having a common connection at their upper ends likewise connected to resistor 65. A current flowing through diode 72 produces an output signal on lead 74 from optical isolator 70. Similarly, a current flowing through diode 73 produces an output signal on lead 75 from optical isolator 71. Thus, the signals on leads 74 and 75 indicate the direction of current flow in ring conductor 56. Normally open contacts 76 are connected across resistor 68 to substantially reduce, when operated, the direct current impedance between the tip conductor 55 and the ring conductor 56. Contacts 76 are used to relay off-hook information to the central office by drawing a substantial loop current when operated.

A second voltage detector 77 is connected to the common junction of resistor 65 and diodes 62, 63, 72 and 73. Detector 77 is similar to detector 58 but is arranged to detect voltages representing normal central office talking battery, nominally 48 volts. A resistor 78 is connected from the same common point through normally open contacts 79 to ground potential. Contacts 79 close when it is desired to simulate the balanced ground connection made at the pay station when the coin hopper trigger is operated, indicating the deposit of a coin. A ringing detector 80 is connected to the upper end of primary winding 52 and serves to detect the presence of ringing signals on ring conductor 56.

Connected to secondary winding 53 is a low-pass filter 81 which limits the frequency range of voice frequency signals from the central office and delivers these frequency limited signals to voice encoder 82. Voice frequency encoder 82 may, for example, be a delta modulator of the type shown in S. J. Brolin U.S. Pat. No. 3,899,754, granted Aug. 12, 1975, or may comprise any other type of digital encoder. In any event, encoder 82 provides on output lead 83 a digital representation of the voice signals delivered to its input. A supervisory signal encoder 84 is also connected to voice encoder 82. Under the control of detector output signals from detectors 58, 60, 61, 70, 71, 77 and 80, encoder 84 encodes appropriate coin supervision states onto the digital pulse stream emanating from voice encoder 82. These supervisory codes replace the voice codes otherwise generated by encoder 82 and are selected to be cyclic codes so as to permit unambiguous detection at the remote terminal without the need for start signals or framing signals.

The incoming digital line 85 is connected to a voice decoder 86 which may likewise be a delta modulation demodulator of the type shown in the above-noted Brolin patent. Decoded voice frequency signals are supplied to low-pass filter 87 and then to voice frequency amplifier 88. These voices frequency signals are then applied through hybrid circuit 50 to conductors 55 and 56 and thence to the central office equipment.

Voice decoder 86 is also connected to supervisory signal decoder 89 which detects the appearance of particular cyclic codes in the digital pulse stream. The appearance of one of these codes (all ones) causes off-hook relay 90 to release, thereby opening contacts 76 and relaying the on-hook condition to the central office. A second cyclic code (all zeros), when detected by decoder 89, operates relay 91 to close contacts 79, thereby providing a coin station ground signal to the central office. The various codes and their generation will be taken up in connection with the other Figures.

Figure 3:
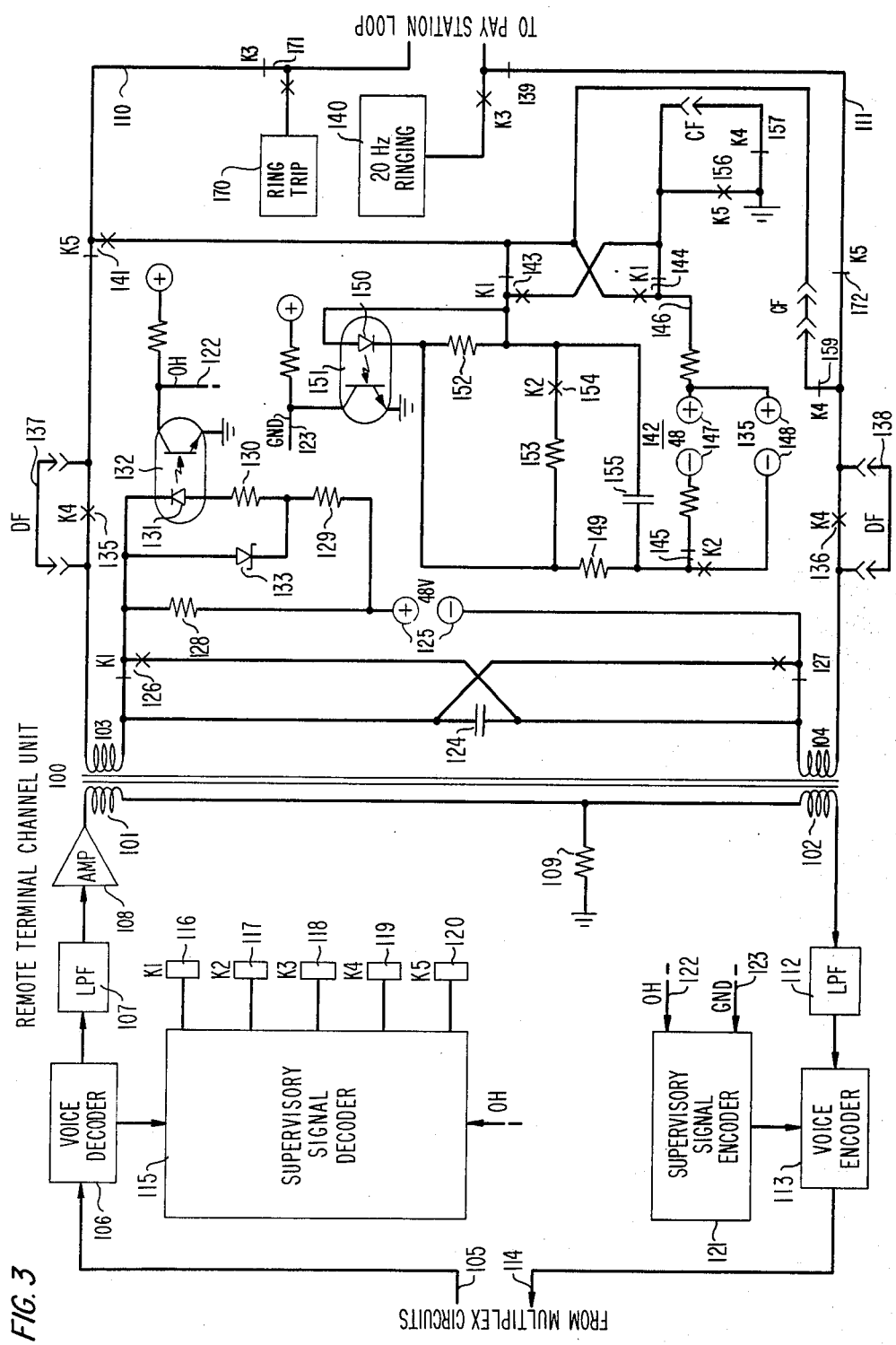
FIG. 3 is a detailed circuit diagram of a remote terminal channel unit useful for providing coin station supervision in a system such as that shown in FIG. 1.

Before proceeding to the description of FIG. 3, a brief description of coin supervision for both dial tone first and coin first operation is in order. In the dial tone first mode of operation, the central office operates on a loop-start basis in exactly the same fashion as normal residential customers. That is, the central office presents −48 volts on the ring conductor and ground on the tip conductor during the idle state. When the pay station handset is lifted, the off-hook condition is detected by the loop current which flows through the handset. In response to the off-hook condition, the central office transmits dial tone to the station set. The coin station user can then use a standard rotary dial or TOUCH-TONE signaling to select the called number. If a chargeable number is called (i.e., not an emergency or an "800" number), the central office performs a coin check by placing −48 volts on the tip conductor with the ring conductor open. If an initial deposit was made at the pay station, the coin hopper trigger is operated which places a balanced ground at the pay station. The central office can detect this balanced ground and, if present, permit the call to be completed. If this coin ground is not present, however, a recorded announcement instructs the pay station user to deposit the required coins.

At the completion of a call or when an initial time period has elapsed, the central office collects the coin by applying +100 to +135 DC volts on the tip conductor. This voltage operates the coin relay at the pay station which deposits the coin in the coin box and resets the coin hopper trigger, thereby removing the trigger ground. If the call continues into overtime, a test is made for a further deposit of the necessary coin by placing +48 volts on the tip conductor and leaving the ring conductor open. The coin hopper trigger ground at the pay station verifies the coin deposit.

At the termination of the call, coin collection is verified by placing −48 volts on the tip conductor or by the reapplication of the coin collect voltage and looking for the absence of a coin hopper trigger ground. In some of the newer electronic switching central offices, the actual current flow to ground during the coin contact operation is monitored for verification of coin collection.

If a call is abandoned prior to completion, the central office applies −100 to −135 volts to the tip conductor to operate a coin refund relay which permits the coin to be returned to the user in the coin return tray. For pay stations with a single coin slot, if only a partial deposit has been made, the station itself provides a coin return relay ground when the handset is hung up so that the coin can be refunded.

On operator-assisted calls, all coins are first returned to the user by applying a refund pulse. The operator then monitors the required deposits by applying +48 volts to the ring conductor and ground on the tip conductor. This polarity reversal allows the totalizer at the pay station to step backward and to transmit tones to the operator as soon as a coin is deposited.

On incoming calls, ringing is supplied to the pay station in the same fashion as normal residential stations. Normal central office ringing current is supplied to the loop. When the handset is lifted, ringing is tripped.

In coin first operation, the loop operates on a ground start basis. That is, when the line is idle the central office applies −48 volts to the ring conductor with the tip conductor open. No action is taken by the central office until an initial deposit is made which operates the hopper trigger to provide a balanced ground at the coin station. At this time, the central office applies dial tone and office battery to the loop and the coin station user can use a rotary dial or TOUCH-TONE dialing. The major differences from dial tone first service are overtime checks and operator-assisted calls. An overtime check is done with either + or −48 volts on the tip conductor with the ring conductor open. An operator call can be effected with either + or −48 volts on the ring conductor with the tip conductor grounded. All other supervision is the same as in dial tone first service.

Returning then to FIG. 3, there is shown a detailed circuit diagram of a remote terminal channel unit suitable for use as channel unit 30 in FIG. 1. The channel unit of FIG. 3 comprises a hybrid transformer 100 having primary windings 101 and 102 and secondary windings 103 and 104. An incoming digital pulse stream on lead 105 is applied to a voice decoder 106 which may be identical to voice decoder 86 in FIG. 2. Decoder 106 supplies analog voice signals to low-pass filter 107, the output of which is applied to voice frequency amplifier 108. The output of amplifier 108 is applied to the upper end of winding 101. A balancing impedance 109 is connected between windings 101 and 102. Voice frequency signals delivered by amplifier 108 are supplied through the hybrid transformer 100 to tip conductor 110 and ring conductor 111 of a pay station loop.

Voice frequency signals received from the pay station on leads 110 and 111 are applied through hybrid transformer 100 to a low-pass filter 112. The output of filter 112 is applied to voice encoder 113 which may be identical to encoder 82 of FIG. 2. A digital pulse stream from encoder 113 is launched on lead 114 to the multiplex/demultiplex circuits 25 of FIG. 1.

Voice decoder 106 is also connected to supervisory signal decoder 115 which detects the various coin supervisory signals encoded on the pulse stream and, in response to these signals, selectively operates relays 116 through 120. Relays 116 through 120 are utilized to replicate the direct current coin supervision conditions on conductors 110 and 111, as will be described hereinafter.

A supervisory signal encoder 121 is connected to voice encoder 113 and, in response to control signals on leads 122 and 123, substitutes cyclic codes for the voice codes normally supplied from encoder 113.

Secondary windings 103 and 104 are separated by a blocking capacitor 124 to prevent direct current flow between conductors 110 and 111. The lower end of winding 103 and the upper end of winding 104 are connected to a 48-volt talking battery source at terminal 125 through a voltage reversing circuit comprising transfer contacts 126 and 127 of relay 116. Current flow from the positive terminal 125 is through a resistor 128 bypassed by a circuit including resistors 129 and 130 and a light-emitting diode 131 of optical isolator 132. A zener diode 133 limits the maximum current through diode 131 and resistors 128, 129 and 130 control the current flow in both diode 131 and in the loop formed by conductors 110 and 111.

Normally open contacts 135 and 136 of relay 119 isolate conductors 110 and 111 from hybrid 100 in the coin first mode of operation. In the dial tone first mode of operation, shorting straps 137 and 138 short-out contacts 135 and 136 to permit immediate voice frequency access to the subscriber loop carrier system.

Transfer contacts 139 of relay 118, when operated, connect ring conductor 111 to a 20 Hz ringing source 140. Ring-tip during the ringing interval is provided by a ring-trip detector 170 inserted in the return conductor 110 by transfer contacts 171 of relay 118. Silent interval trip is provided by optical isolator 132 which detects the flow of current through the station set when the handset is removed.

Coin supervision is provided through transfer contacts 141 of relay 120 which connect tip conductor 110 to a controllable voltage supply 142 through reversing contacts 143 and 144 of relay 116. A break contact 172 on relay 120 opens the path to conductor 111 during coin supervision. Transfer contacts 145 of relay 117 select between a 48-volt voltage source at terminals 147 and a 135-volt voltage source at terminals 148. Current supplied from either of these sources flows through resistor 149 and light-emitting diode 150 of optical isolator 151. A bypass resistor 152 bypasses a portion of this current around diode 150 and the bypass current is augmented by a path through resistor 153 under the control of normally open contacts 154 of relay 117. A capacitor 155 bypasses alternating current components around optical isolator 151.

Normally open contacts 156 of relay 120 connect ground to one side of voltage source 142 to complete the circuit for source 142. In the coin first mode of operation, normally closed contacts 159 of relay 119 are used to supply the necessary −48 volts to ring conductor 111 to detect coin ground starting. Also during coin first operation, normally closed contacts 157 of relay 119 supply the necessary voltage ground to permit ground starting. The operation of the circuits of FIG. 3 can be better understood from the following table which indicates the various coin supervisory states, the corresponding central office conditions and the detector outputs of the detectors of FIG. 2. These conditions are replicated at the remote terminal channel unit by relays 116 through 120.

office voltages which originate from a 48-volt source, but which may vary from 8 or 10 volts up through 54 volts, depending on the central office supply, and the channel unit loading conditions on that supply. The threshold for detector 77 of FIG. 2 is set at about 11.2 volts to insure accurate detection of central office 48-volt battery voltages. This threshold is set by selecting appropriate values for resistors 202, 203, 206, 207, 209 and 210.

Detector 58 in FIG. 2 must detect coin collect and

TABLE

| State | Central Office Conductors | | Detector Outputs | | | | | | | | |
|---|---|---|---|---|---|---|---|---|---|---|---|
| | Tip | Ring | I1 | I2 | I3 | I4 | V$_{-48}$ | V$_{+48}$ | V$_{-135}$ | V$_{+135}$ | Ring |
| 1. −Coin Check | −48 | Open −48 | | X | X* | | X | | | | |
| 2. +Coin Check | +48 | Open +48 | X | | X* | | | X | | | |
| 3. Coin Return | −135 | Open −135 | | X | X* | | X | | X | | |
| 4. Coin Collect | +135 | Open +135 | X | | X* | | | X | | X | |
| 5. Loop Mode | GND −48 | −48 GND | X | X | X | X** X | | | | | |
| 6. Ground Start (CF) | Open | −48 | | X | X | | | | | | |
| 7. Operator (DTF) | GND | +48 | X | X | | X** | | | | | |
| 8. Ringing | GND | 20Hz | | | | | | | | | X |

*Only for central offices applying coin voltages to both conductors.
**Only for the off-hook condition.

Figure 4:
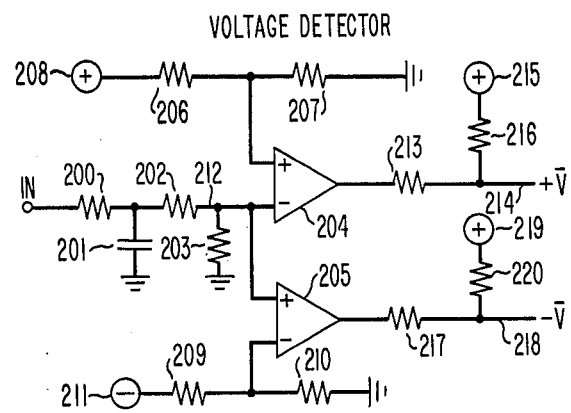
FIG. 4 is a detailed circuit diagram of a voltage detector useful in the central office channel unit of FIG. 2.

In FIG. 4 there is shown a detailed circuit diagram of the voltage detectors 58 and 77 in FIG. 2. These two voltage detectors are identical except for the threshold values involved and hence the voltage level detected. The detector of FIG. 4 comprises a low-pass filter including resistor 200 and capacitor 201 and a voltage divider comprising resistors 202 and 203. The midpoint of resistors 202 and 203 is connected to the negative input of operational amplifier 204 and the positive input of operational amplifier 205. The positive input of amplifier 204 is connected to the midpoint of a voltage divider comprising resistors 206 and 207 connected between positive voltage source 208 and ground potential. Similarly, the negative input of operational amplifier 205 is connected to the midpoint of a voltage divider comprising resistor 209 and 210 connected between negative voltage source 211 and ground potential.

When the voltage on input lead 212 becomes sufficiently positive to exceed the reference voltage at the positive input of amplifier 204, amplifier 204 is triggered to produce a low output through resistor 213 to output lead 214. Otherwise, output lead 214 is biased to a high voltage point from voltage source 215 through resistor 216.

If the voltage on input lead 212 to operational amplifier 205 becomes more negative than the reference voltage at the negative input of amplifier 205, the output of amplifier 205 supplied through resistor 217 to output lead 218 goes low. Otherwise, the signal on lead 218 is biased to a high voltage point from voltage source 219 through resistor 220.

It can thus be seen that the voltage detector of FIG. 4 provides a separate output when a positive input voltage exceeds a positive reference voltage (on output lead 214) and provides an output voltage (on output lead 218) if the input voltage is more negative than a reference voltage. Detector 77 in FIG. 2 must detect central coin return voltages which range between 100 volts and 135 volts. In order to accurately distinguish between such coin voltages and the normal central office talking battery voltages, the threshold of detector 58 is set at approximately 73 volts. This insures accurate detection with a maximum margin for error. This threshold is set by providing appropriate values for the resistors in the voltage dividers of FIG. 4.

Figure 5:
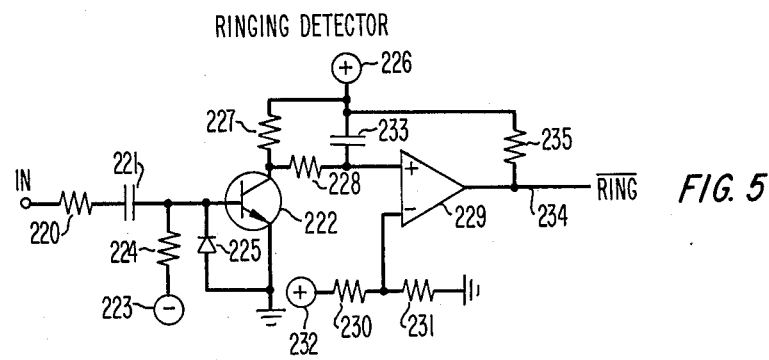
FIG. 5 is a detailed circuit diagram of a ringing signal detector useful in the central office channel unit of FIG. 2.

The ringing detector 80 of FIG. 2 may have the configuration shown in FIG. 5. The ringing detector of FIG. 5 includes an input resistor 220 and a direct current blocking capacitor 221. Capacitor 221 is connected to the base of transistor 222 which is biased from negative voltage source 223 through resistor 224. A diode 225 is connected to the base and emitter of transistor 222 and polarized to prevent reverse breakdown of the base-emitter junction of transistor 222.

The collector of transistor 222 is biased from positive voltage source 226 through resistor 227 and is also connected through resistor 228 to the positive input of operational amplifier 229. The negative input of amplifier 229 is connected to the midpoint of a voltage divider comprising resistors 230 and 231 connected between positive voltage source 232 and ground potential. The positive input of amplifier 229 is connected through capacitor 233 to the positive voltage source 226. The output of amplifier 229 on lead 234 is connected through resistor 235 to positive voltage source 226.

In operation, ringing signals applied to the input of the circuit of FIG. 5 have their direct current components blocked by capacitor 221 and cause transistor 222 to conduct during positive half-cycles of the ringing current. Each time transistor 222 conducts, a charge is accumulated on capacitor 223. This charge continues to accumulate during successive positive half-cycles of the ringing signal until the voltage at the positive input of operational amplifier 229 goes below the reference voltage at the negative input. At this time, the output of amplifier 229 on lead 234 goes to a low value and remains there so long as ringing signals maintain the charge on capacitor 233. When input ringing signals terminate, the charge on capacitor 233 is discharged through resistors 227 and 228 to restore the detecting circuit to its normal condition. At this time, output lead 234 returns to its high voltage state, determined by voltage source 226 through resistor 235.

Figure 6:
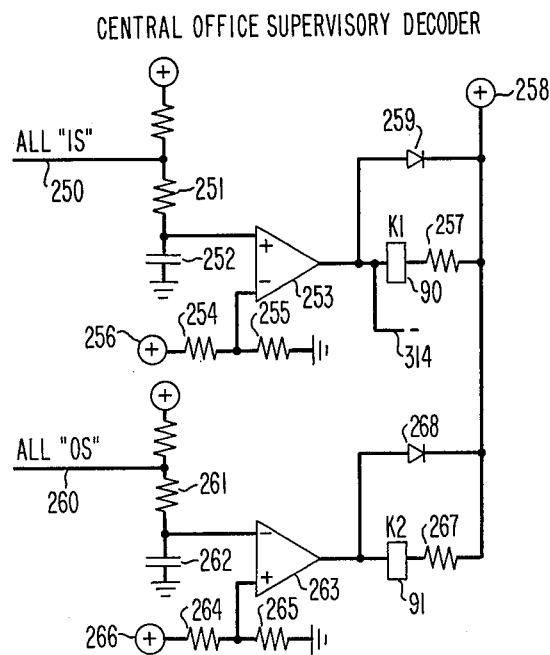
FIG. 6 is a detailed circuit diagram of a supervisory signal encoder useful in the central office channel unit of FIG. 2.

In FIG. 6 there is shown a central office supervisory signal decoder 89 of FIG. 2. Upon the reception of the all ones code from the remote terminal on lead 85, a signal appears on input lead 250. This signal is filtered by a low-pass filter comprising resistor 251 and capacitor 252 and applied to the positive input of operational amplifier 253. The negative input of amplifier 253 is connected to the midpoint of a voltage divider comprising resistors 254 and 255 connected between positive voltage source 256 and ground potential. The output of amplifier 253 is connected to the winding of K1 relay 90 and through current limiting resistor 257 to positive voltage source 258. A diode 259, connected across relay winding 90 and resistor 257, prevents inverse voltages from building up across the relay winding when it is de-energized. As shown, relay 90 releases when the all ones code is received.

When an all zeros code is received on input lead 85 (FIG. 2), a signal appears on lead 260 which is applied through a low-pass filter including resistor 261 and capacitor 262 to the negative input of operational amplifier 263. The positive input of amplifier 263 is connected to the midpoint of a voltage divider including resistors 264 and 265 connected between positive voltage source 266 and ground potential. When the signal at the negative input of amplifier 263 exceeds the reference voltage at the positive input, the output of amplifier 263 goes low to provide an operate path for relay winding 91 through current limiting resistor 267 from positive voltage source 258. Diode 268 prevents reverse voltages from building up across relay winding 91. As shown, the all zeros code causes relay 91 to operate. Relay windings 90 and 91 control the contacts shown in FIG. 2 to cause a loop closure or a balanced ground connection to the central office to thereby indicate the off-hook condition and coin ground condition, respectively.

In FIG. 7 there is shown a detailed circuit diagram of the central office supervisory signal encoder 84 of FIG. 2. In general, this encoder takes output from all of the detectors of FIG. 2 and logically combines the detector outputs to generate cyclic codes for transmission facility 12 (FIG. 1) to the remote terminal to control the operation of a coin station.

In particular, AND gates 300, 301, 303 and 304 combine the various detector outputs, as shown, to generate signals representing the necessary coin supervisory states. Thus, AND gate 300 combines the output of voltage detector 77 with an inverted output from voltage detector 58 and outputs from optical isolators 61 and 71 (inverted output) to provide an output lead 305 a signal representing a "minus" coin check. Similarly, AND gate 301 combines detector outputs to provide on output lead 306 an indication of the "plus" coin check supervisory state. AND gate 303 provides a ground start signal on lead 308. The output of AND gate 304 indicates a positive (operator) loop mode condition. This triggers a 200-millisecond one-shot multivibrator 309 which provides a 200-millisecond signal on output lead 310. This one-shot signal reverses the polarity of the talking battery at the remote end to permit an operator to monitor coin deposits. The output of the ringing detector of FIG. 5 appears on lead 234. The positive output of the 135-volt detector 58 in FIG. 1 appears on lead 311 while the negative 135-volt detector 58 appears on lead 312. The outputs on leads 305, 306, 308, 310, 324, 311 and 312 represent the possible supervisory states necessary to control coin stations in either the coin first or dial tone first mode of operation. Since only six unique cyclic codes are available, it is necessary to provide strapping options for coin first and dial tone first modes of operation since each mode requires only six of the eight states. The input leads to logic 313 are the same as the output leads from the state logic 299 and have identical reference numerals. A signal on lead 314 indicates the reception of the all ones on-hook code from the remote terminal as taken from the output of amplifier 253 in FIG. 6. This signal is combined with the ground start signal 308 in AND gate 315, the output of which is connected to the input of OR gate 316 in the coin first mode. The other input to OR gate 315 is taken from coin collect lead 311. The output of OR gate 316 on lead 317 is identified by the letter "A."

The ringing signal on lead 234, the minus coin check signal on lead 305 and the plus coin check signal on lead 306 (in the coin first mode only) are combined in OR gate 318 to provide an output signal on lead 319 identified as "B." The coin collect signal on lead 311 and the ringing signal on lead 234 are combined in OR gate 320 to provide an output signal on lead 321 labeled "C." The output lead 322 (labeled "D") is taken from the ground start signal on lead 308 in the coin first mode and from the operator signal on lead 310 in the dial tone first mode. The output on lead 312 (labeled "E") is taken directly from the coin return signal on lead 312.

The A, B, C, D and E signals of combination logic 313 are combined in output logic 325 to generate unique cyclic codes. Thus, AND gate 326 provides on output lead 327 a signal which causes the generation of the cyclic code "1100," AND gate 328 provides an output signal on lead 329 which generates the cyclic code "1110," AND gate 330 provides on output lead 331 a control signal to generate the cyclic code "0001" and AND gate 332 provides an output signal on lead 333 to generate the cyclic code "1010." A signal on lead 322 generates the cyclic code "1111" and, simultaneously, through inverter circuit 334 and AND gate 335, inhibits the generation of the all zeros code on lead 336. Otherwise, the all zeros code is generated by a coin return signal on lead 312 through AND gate 335. Signals on leads 312 and 322 are combined in NOR gate 317 to inhibit gates 326, 328, 330 and 332 if either the all zeros or the all ones codes are being generated.

Circuits for generating these cyclic codes are shown in the above-mentioned Canniff et al patent and will not be disclosed in detail here.

In FIG. 8 there is shown a detailed logic diagram of supervisory signal decoder 115 of FIG. 3. The circuit of FIG. 8 responds to received cyclic codes on leads 350, 351, 352, 353, 354 and 355 to control the operation of relays 116 through 120 also shown in FIG. 3. An off-hook signal on lead 122 provides the remaining input to the decoder circuits of FIG. 8.

Signals on leads 350 and 351 (representing the "1100" and "1110" codes) are combined in NOR gate 356, the output of which is applied to one input of NAND gate 357. The output of NOR gate 356 is also applied through the normally closed portion of contacts 358 of relay 116 to one input of AND gate 359. Finally, the output of NOR gate 356 is also applied through inverter 360 to one input of OR gate 361 and through the normally open portion of contacts 358 to one input of AND gate 359. The remaining input to AND gate 359 is taken from NAND gate 357, the output of which is also applied to the clock input of flip-flop 362. The output of AND gate 359 is applied through relay driver circuit 363 to operate K5 relay 120.

Signals on input leads 351 and 353 are combined in OR gate 364 and applied to relay driver 365 to operate K2 relay 117. Signals on leads 352 and 353 are combined in NOR gate 366, the output of which is applied to one input of NAND gate 357. An off-hook signal on lead 122 is inverted in inverter 367 and combined with the "1010" code signal on lead 354 in AND gate 368. The output of AND gate 368 is applied to relay driver 369 which operates K3 relay 118. The off-hook signal on lead 122 passes through delay circuit 370 which delays the off-hook to on-hook transition by 150 milliseconds. The output of delay circuit 370 provides the remaining input to AND gate 359. The output of inverter 372 (not "1111") is combined in OR gate 373 with the output of inverter 371. For the coin first mode of operation only, the output of OR gate 373 is connected to relay driver 374 to operate K4 relay 119. The output of one-shot circuit 377 is applied to NAND gate 357 and inverter 371. The one-shot 377 is only connected in the coin first mode. K1 relay 116 is normally operated by relay driver 375 triggered by the output of OR gate 361. Normally, OR gate 361 is driven by the output of inverter 360. In the dial tone first operation, however, the Q output of flip-flop 362 is connected to OR gate 361 to also operate K1 relay 116. Flip-flop 362 is preset to the one state by the output of AND gate 376, combining signals on leads 355 and 122. Flip-flop 362 is cleared to the zero state by a signal on lead 122.

In operation, K1 contacts 158 insure that AND gate 359 is not fully enabled until after the operation of K1 relay 116. This insures that the K3 coin supervision relay contacts of FIG. 3 do not operate until after the K1 polarity contacts of FIG. 3 have already operated. Flip-flop 362 allows K1 relay 116 to be operated by the 200 millisecond operator signal from the central office and to remain in this state until released by the output of NAND gate 357 or an output signal on lead 122.

The remote terminal must be able to provide all of the normal supervisory functions, such as off-hook dial pulsing and ringing, as well as all of the required coin functions. The remote terminal monitors the incoming data stream from the central office for the presence of coin controlled codes. When the codes are received, the appropriate relays are operated. Dial pulses are detected by the optical isolator 132 in FIG. 3 which checks for the presence of a loop current flowing in the subscriber loop. The output of the optical isolator indicates the presence of a loop current in excess of a threshold of 10 mA. In the absence of loop current, the circuit forces the transmission of continuous ones to the central office terminal. Once the threshold is exceeded, the continuous ones are removed from the outgoing line and voice code can be transmitted.

In the coin first mode, the optical isolator 151 of FIG. 3 continuously monitors the ring conductor (via contacts 159) for the presence of a ground current. If a current in excess of 5 mA occurs, an output is produced by detector 151 which forces the digital encoder to transmit continuous zeros to the central office terminal. If the ground current is below this threshold, continuous ones are transmitted to the central office terminal. The continuous ones are transmitted to the central office as long as the remote terminal is receiving all ones. When the central offie terminal receives the all zeros signal, it applies a coin ground via its coin ground relay 92 and also operates the off-hook relay K1. The central office detects this ground and responds by applying ground to the tip conductor. The central office terminal then transmits voice frequency modulation to the remote terminal. When the remote terminal receives voice frequency signals instead of the all ones code, it switches to the loop mode, operating K4 relay 119 and transmitting voice frequency modulation back to the central office. The channel is now ready for dial pulsing. The coin ground detector has a 5 mA threshold for coin check (K2 relay 117 releases) and a 10 mA threshold for coin refund (K2 relay 117 operates). Above these thresholds, the remote terminal transmits continuous zeros to the central office. If these thresholds are not exceeded, the remote terminal continues to transmit voice frequency modulation if off-hook is detected and continuous ones if no off-hook is detected.

It can be seen that the above-described circuit arrangements enable complete control of a coin station over a digital subscriber loop transmission system. Moreover, by the use of a simple option plug, both coin first and dial tone first pay station operation can be accommodated. The signaling codes traversing the digital system are all cyclic codes which are applied continuously and can be detected as continuous state signals. This permits the carrier system to be totally transparent to the central office and coin station operation is possible through the carrier system with no special modifications to the central office equipment. This latter advantage simplifies the installation of coin station lines which are served through subscriber loop carrier systems.

I claim:

1. A coin supervisory signal detector for central office wire pairs in a telephone system
    characterized by
    voltage detection means for detecting the magnitude and polarity of voltages appearing on said wire pairs,
    a plurality of optical isolators for detecting the direction of current flow in each wire of said wire pairs, and
    combinatorial logic circuit means for combining the outputs of said voltage detection means and the outputs of said isolators to provide separate indications of each of a plurality of unique coin supervisory signaling states to be transmitted to a remote location in said telephone system.

2. The supervisory signal detector according to claim 1 further
    characterized in that
    said voltage detection means comprises means for detecting central office talking voltages.

3. The supervisory signal detector according to claim 1 further
    characterized in that
    said voltage detection means comprises means for detecting central office coin control voltages.

4. The supervisory signal detector according to claim 1 further
    characterized in that said plurality of optical isolators comprises two oppositely poled isolators connected in series with each of said wires.

5. The supervisory signal detector according to claim 1 further
characterized in that
said combinatorial logic circuit means includes optional selecting means for selectively providing coin first supervisory signal detection or dial tone first supervisory signal detection.

6. The supervisory signal detection according to claim 1 further
characterized in that
said combinatorial logic circuit means includes means for converting a plurality of coin supervisory signals into a lesser plurality of transmission control signals.

7. In a subscriber loop carrier system for establishing a plurality of subscriber channels over a lesser plurality of transmission lines, means for deriving at least one coin station channel over said carrier system, said deriving means
characterized by
means including a plurality of optical isolators for detecting a plurality of coin supervisory states established at the central office end of one channel of said system,
means including combinatorial logic circuits for encoding said plurality of supervisory states into a lesser plurality of cyclic transmission codes for transmission over said system, and
means at the remote end of said system and responsive to said transmission codes for replicating said coin supervisory states on a coin station loop at said remote end of said system.

8. The combination according to claim 7 further
characterized by
means including a plurality of optical isolators at said remote end of said system for detecting off-hook and coin ground conditions on said coin station loop,
means for encoding said off-hook and coin ground conditions for transmission to said central office end of said system, and
means at said central office end of said system for replicating said off-hook and coin ground conditions for detecting at said central office.

9. The combination according to claim 7 further
characterized in that
said coin supervisory state detecting means includes means for selectively detecting coin first supervisory states or dial tone first supervisory states.

10. The combination according to claim 7 further
characterized in that
said coin supervisory state detecting means comprises
means for detecting the magnitude and polarity of voltages at said central office end,
said optical isolators comprising means for detecting the direction of current flow in each wire of said one channel, and
means for logically combining the outputs of said voltage detecting means and said optical isolating means.

* * * * *

UNITED STATES PATENT AND TRADEMARK OFFICE
CERTIFICATE OF CORRECTION

PATENT NO. : 4,277,647
DATED : July 7, 1981
INVENTOR(S) : Stephen J. Brolin and Samuel Colodner It is certified that error appears in the above—identified patent and that said Letters Patent is hereby corrected as shown below:

Column 4, line 28, "voices" should read --voice--. Column 6, line 42, "Ring-tip" should read --Ring-trip--. Column 10, line 22, "315" should read --316--. Column 12, line 6, "offie" should read --office--. Column 13, lines 8-9, "optional" should read --option--.

Signed and Sealed this

Twenty-fifth Day of May 1982

[SEAL]

Attest:

GERALD J. MOSSINGHOFF

Attesting Officer

Commissioner of Patents and Trademarks